United States Patent [19]

Hsu

[11] Patent Number: 5,711,902
[45] Date of Patent: Jan. 27, 1998

[54] GAS-INDUCED REACTOR

[76] Inventor: Yung-chien Hsu, 3F, No. 147-2, Lane 100, Hu Lin Street, Taipei, Taiwan

[21] Appl. No.: 749,853

[22] Filed: Nov. 15, 1996

[51] Int. Cl.$^6$ ..................................................... B01F 3/04
[52] U.S. Cl. ................................................ 261/91; 261/93
[58] Field of Search ............................................ 261/91, 93

[56] References Cited

U.S. PATENT DOCUMENTS

| Re. 32,562 | 12/1987 | Litz | 261/91 |
|---|---|---|---|
| 4,699,740 | 10/1987 | Bollenrath | 261/93 |
| 4,750,994 | 6/1988 | Schneider | 261/93 |
| 4,798,131 | 1/1989 | Ohta et al. | 366/307 |
| 5,084,252 | 1/1992 | Cahill et al. | 423/16 |
| 5,102,630 | 4/1992 | Lee | 261/93 |
| 5,314,076 | 5/1994 | La Place et al. | 261/91 |
| 5,451,348 | 9/1995 | Kingsley | 261/93 |

*Primary Examiner*—Tim R. Miles
*Attorney, Agent, or Firm*—Beveridge, DeGrandi, Weilacher & Young LLP

[57] ABSTRACT

Disclosed is a gas-induced reactor which mainly includes a tank body without inner baffles and a draft tube with inner baffles mounted in the tank body. An upper and a lower turbines are installed in series on a shaft of said tank body and enclosed by the draft tube. The turbines each have six 45° pitched, rectangular, flat blades. When the two turbines rotate at high speed to agitate gas and liquid in the draft tube, a downward regular gas vortex is formed at a center of liquid surface in the tank body above the draft tube. The regular gas vortex is pulled inward to the draft tube and is disturbed by the baffles in the draft tube to become an irregular gas vortex in the draft tube. The irregular gas vortex is broken by the rotating turbines into bubbles which are angularly distributed out of the draft tube and into liquid in the tank body. The gas vortex formed by the rotating turbines in the draft tube create a gas-induction phenomenon which may increase the length of gas flow paths and the numbers of gas circulation in the tank body by inducing gas escaped from the liquid surface back into the liquid. The gas utilization ratio is therefore largely increased in the gas-induced reactor.

5 Claims, 5 Drawing Sheets

GAS-INDUCED REACTOR

FIELD OF THE INVENTION

The present invention relates to a newly developed reaction vessel, and more particularly to a gas-liquid reactor applicable to the reactions of ozone disinfection, decomposition of organic matter in wastewater, reduction of hydrogenated liquid, oxidation in the pesticide manufacture, tap water disinfection, and many other similar reactions. The reaction vessel of the present invention is characterized by a draft tube concentrically fixed around a shaft and an upper and a lower turbines fixedly mounted on the shaft in series and enclosed by the draft tube in the reaction vessel. When the turbines swirl at high impeller speed, a central gas vortex is formed in the reactor. Gas above liquid surface shall be sucked into the gas vortex and is broken into bubbles by the turbines, creating a gas-induction effect which enables the introduced gas to repeatedly circulate in the reactor by sucking gas escaped from liquid surface into the liquid again. The utilization ratio of the reactive gas can therefore be largely increased.

BACKGROUND OF THE INVENTION

One example of the conventional gas-liquid reactors has a cylindrical vessel. A long rotating shaft extends through a longitudinal central axis of the vessel. Impellers, such as 4-blade disc turbines are mounted on the long shaft and enclosed in the vessel. Alternatively, a Rushton turbine with somewhat power-consuming consuming six flat blades is mounted on the long shaft as an agitating impeller while another 4-blade turbine with pitched blades is mounted to a lower end of the long shaft so that both of them are driven to rotate by a motor connected to an upper end of the long shaft. When the turbines operate at a rotating speed less than 1,000 rpm, an agitating effect can be achieved. Moreover, there are several baffles having a rectangular cross section provided on an inner wall of the hollow vessel. The baffle each has a width of about one tenth to one twelfth of an inner diameter of the vessel to avoid swirling flow and to increase the gas-liquid contact so as to achieve a good mixing effect. U.S. Pat. No. 5,102,630 granted to Lee discloses narrower baffles having a width of about 0.02 to about 0.04 times of the reactor inner diameter to increase the utilization ratio of the introduced reactive gas.

In the conventional gas-liquid reactors, the reactive gas must be dispersed into small bubbles by a gas sparger and then enters into liquid inside the reactor from a bottom of the turbine. With the agitation of the turbines, bubbles disperse radially into an upper and a lower part in the reactor. In general agitating type reactors, no gas-induction effect is achieved when the swirling flow is prevented. Bubbles are utilized for once and then easily escape from the liquid surface without circulation in the liquid phase. Furthermore, a liquid flow path in the reactor is short which also prevents the reactive gas from being efficiently utilized. This is a main drawback existed in the conventional gas-liquid reactors.

Moreover, due to the lower gas utilization ratio of conventional gas-liquid reactors, there is a large amount of unreacted gas escaped from the reactor. Therefore, accessory equipment for handling the unreacted gas is needed to increase the gas utilization ratio. This shall, of course, increase the whole equipment and operation costs. U.S. Pat. No. 4,798,131 to Ohta et al. and U.S. Pat. No. 5,084,252 to Cahill et al. both disclose a draft tube with downward inner turbines disposed inside a reaction vessel to increase the gas-liquid mixing effect. In the U.S. Patent granted to Ohta et al., the draft tube is centered in a lower half of the reaction tank. A continuous circulation in the reaction tank includes a fast downward flow through the draft tube and a slow upward flow outside the draft tube. The purpose of such specially designed circulation is to induce crystal growth and to remove tartars from the liquid. A coning zone is defined in the tank above the draft tube. The slow upward flow moves toward a calming zone above the circulation, facilitating classification of crystalline matter which is reintroduced into the face downward flow. The liquid product from which the tartar has been removed and which is collected in an upper section of the tank, is tapped off by an overflow port located near a top of the tank. The reaction vessel and the draft tube disclosed in this patent are designed for tartar's separation which is different from the objects of the present invention.

In the U.S. Pat. No. 5,084,252 to Cahill at al., means is disclosed for continuous precipitation of granular uranium peroxide. A reaction vessel and an agitation method are designed to avoid filter plugging and caking problems. The reaction vessel has an interiorly disposed draft tube which divides the vessel into an outer reaction zone and an interior reaction zone. Mill solution and reacting peroxide are continuously agitated inside the draft tube to provide a continually downwardly moving stream of reacting uranium solution. The solution moves out of a bottom of the draft tube upwardly and continually circulates parallel to a longitudinal axis of the draft tube. Baffles are positioned on an exterior wall of the draft tube to prevent rotation of solution about the longitudinal axis.

The above earlier U.S. Patents are different from the present invention in their designs and can only provide shorter flow paths and lower recycling effect. U.S. Pat. No. Re. 32,562 discloses a gas-liquid mixing apparatus in which vortex and turbulence are created to increase the length of flow path and the recycling. In the gas-liquid mixing apparatus disclosed in this patent, an axial flow down-pumping impeller is located in a draft tube. The draft tube itself is not provided with any baffle. Instead, several first baffles are disposed immediately above the draft tube to create several vortices between the draft tube and the first baffles, causing gas in the mixing apparatus to be sucked into the vortices and enter into the draft tube. A main improvement provided by this invention is that the liquid flows at a speed at least 1 foot per second to increase turbulence of the liquid. And, several second baffles are disposed immediately below the draft tube to create a high shear zone between the impeller and the second baffles.

In the invention disclosed in the U.S. Pat. No. Re. 32,562, the first baffles are located above and project from a top end of the draft tube while the second baffles project from a bottom end of the draft tube. Such arrangements will increase the power consumption for agitation. On the other hand, without baffles and with a helical impeller employed and positioned in the draft tube are different from the present invention.

SUMMARY OF THE INVENTION

A primary object of the present invention is to provide a new gas-induced reactor which was accepted in part by the *AIChE Journal* on May 30, 1996. The gas-induced reactor according to the present invention includes an elongated cylindrical tank body without baffle on an inner wall thereof. A draft tube provided with interior baffles and having two ends with rounded edges is disposed in the tank body. The draft tube is fixedly and concentrically mounted around a central shaft of the tank body. Two in-series 45° pitched six-blade downward turbines are also fixedly mounted on the central shaft and enclosed by the draft tube to serve as impellers. When the turbines rotate at high speeds, a single central gas vortex is formed on a free surface of liquid in the tank, inducing gas above the liquid surface into the liquid in the tank so as to increase the gas utilization ratio.

Another object of the present invention is to provide a new gas-induced reactor having an elongated cylindrical tank body without baffle on an inner wall thereof so as to reduce resistance to liquid flowing and largely reduce power consumption. Moreover, when two in-series turbines rotate at high speed in a draft tube, a regular central gas vortex is formed at a center of the liquid surface above the draft tube. The regular vortex of gas is pulled inward to the draft tube by the two turbines and is then disturbed by inner baffles of the draft tube to become an irregular gas vortex. The irregular gas vortex is then broken into bubbles by the upper turbine and finally distributed out of the draft tube from a bottom thereof by the lower turbine. The bubbles out of the draft tube flow up spirally through an annular area between the draft tube and the inner wall of the tank body. A large amount of these bubbles are pulled into the draft tube again by a strong pull force from the rotating turbines. By this way, the bubble flow path is increased in length and the reactive gas can be circulated many times in the tank liquid for fully reacting.

A further object of the present invention is to provide a new gas-induced reactor in which reactive gas is introduced into a draft tube between two in-series turbines, so that the introduced reactive gas is directly broken by the turbines into bubbles. No sparger is required, and no plugging problems with sparger will occur as in the conventional gas-liquid reactors.

BRIEF DESCRIPTION OF THE DRAWINGS

The features of the present invention in its structure and its operation can be best understood by referring to the following detailed description of the preferred embodiment and the accompanying drawings, wherein.

DETAILED DESCRIPTION OF THE PREFERRED EMBODIMENT

The present invention relates to a gas-induced reactor which is particularly designed to improve the drawbacks existed in the conventional agitating tanks. These drawbacks include, for example, high power consumption, low gas utilization ratio, and short flow paths of bubbles.

Figure 1:
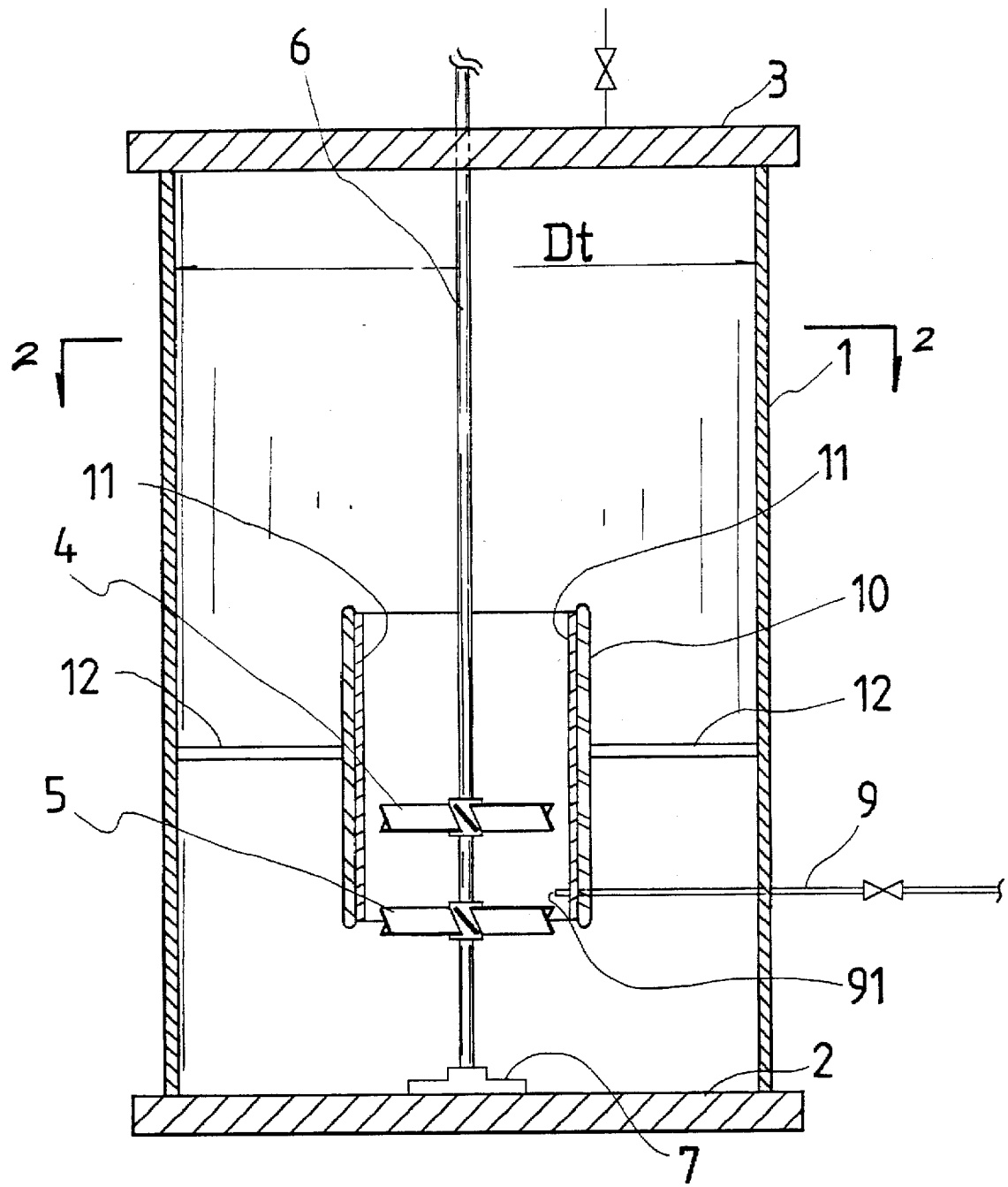
FIG. 1 is a vertical sectional view of a preferred embodiment of the present invention.
Figure 2:
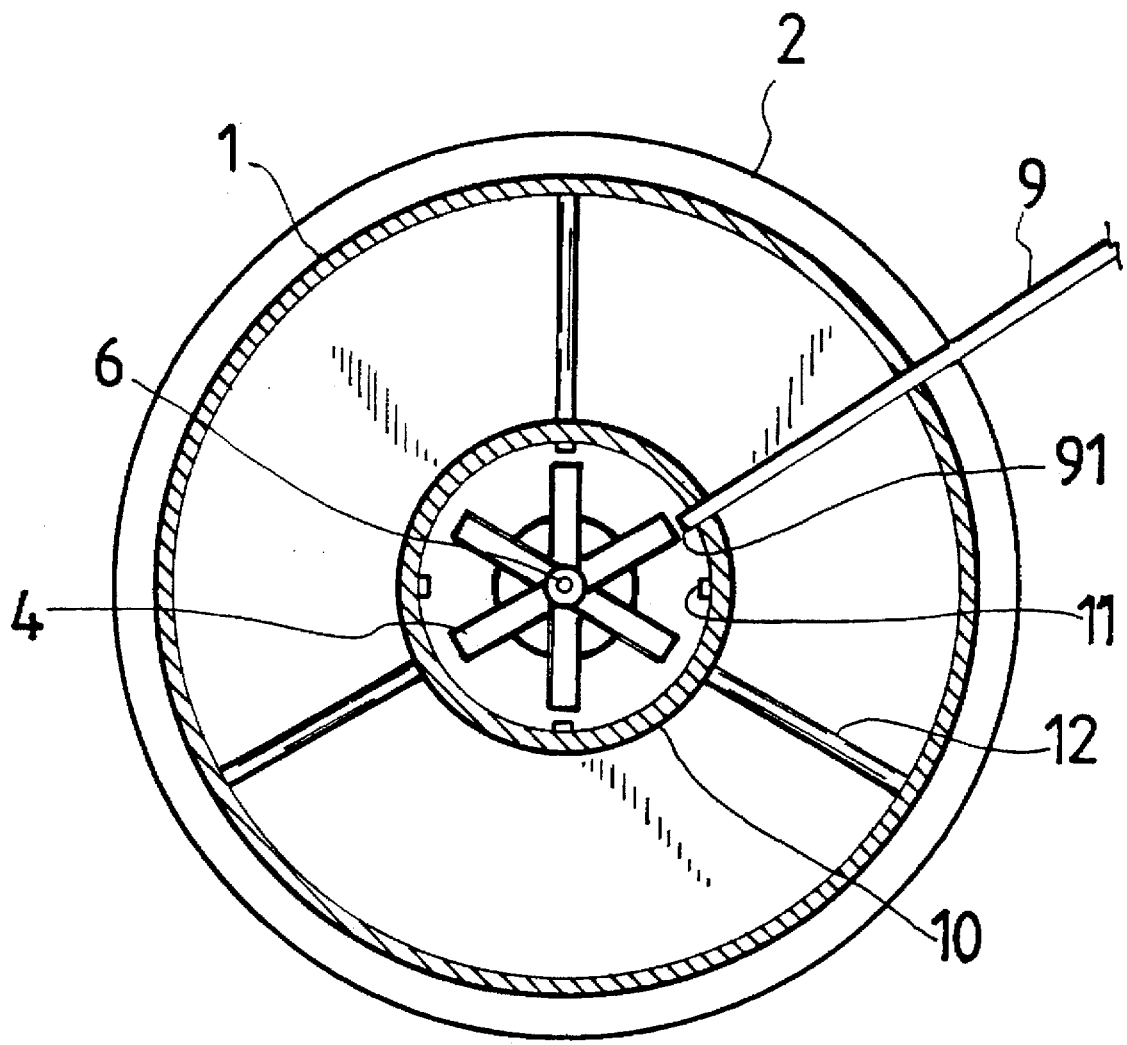
FIG. 2 is a cross sectional view taken on line 2—2 of FIG. 1.

Please now refer to FIGS. 1 and 2 in which a preferred embodiment of the gas-induced reactor according to the present invention is shown. The gas-induced reactor mainly includes an elongated cylindrical reacting tank body 1 having an inner diameter $D_t$ and being provided therein with a draft tube 10. The tank body 1 does not have any baffle on an inner wall thereof so as to facilitate the creation of central vortex in the tank body 1 and to reduce power consumption for liquid agitation.

A flat bottom 2 and a top cover 3 are provided to a bottom and a top of the tank body 1, respectively, to close the tank body 1.

Figure 3A:
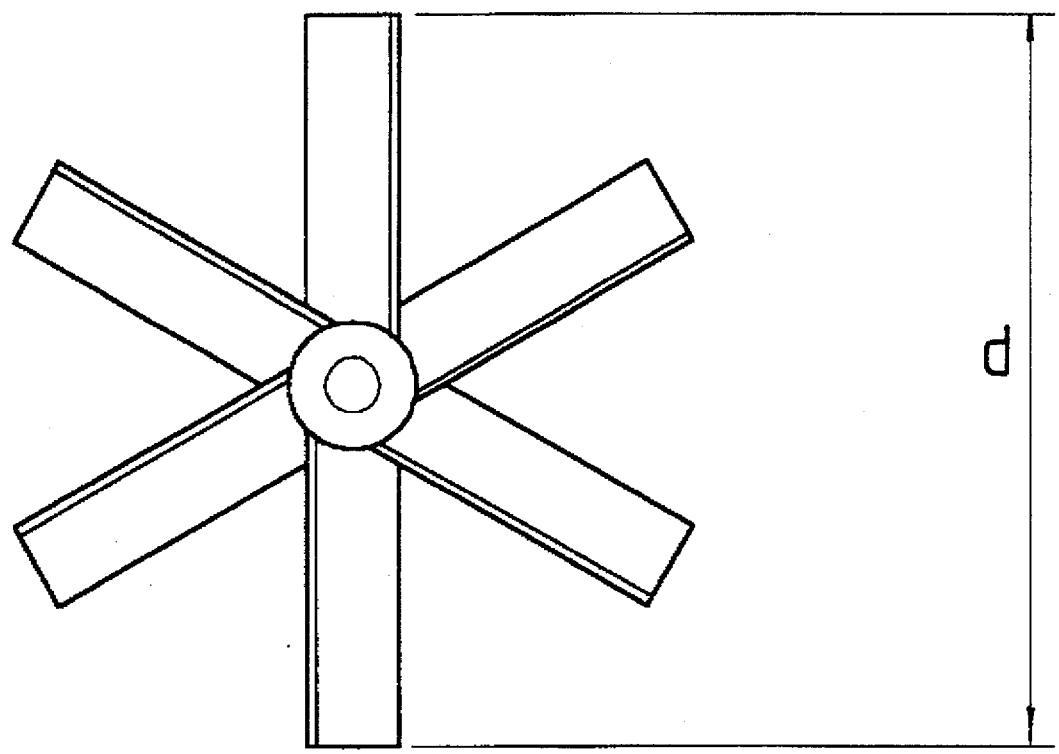
FIG. 3A is a top view of the turbine of the present invention.
Figure 3B:
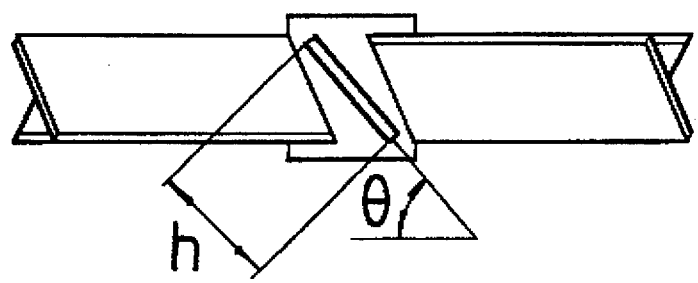
FIG. 3B is a side view of the turbine of the present invention.

An upper and a lower turbines 4, 5 are installed in a lower half of the draft tube 1 and each consists of six 45° pitched, rectangular flat blades. FIGS. 3A and 3B show the detailed configuration of the turbines. The turbines 4, 5 each has an overall diameter d of about 0.3 to about 0.5 times of the diameter $D_t$ of the tank body 1. Each of the blades has a height h of about one eighth of the diameter d of the turbine 4, 5. The upper and the lower turbines 4, 5 are installed in series on a shaft 6 of the tank body 1. The shaft 6 extends through a longitudinal central axis of the tank body 1 and is driven by an external motor (not shown) to rotate at high speed.

When the upper turbines 4 and 5 rotate at high speed, a central regular gas vortex is formed in the tank body 1 above the draft tube 10 and an irregular gas vortex is formed in the draft tube 10. The irregular gas vortex is broken into bubbles by the upper turbine 4 and the bubbles are driven downward by a downward force in the draft tube 10 toward the lower turbine 5. Similar to the upper turbine 4, the lower turbine 5 is installed on the shaft 6 and on a level with a lower end of the draft tube 10. The lower turbine 5 is spaced from the upper turbines 4 at a distance of about one times of the turbine's diameter d. The bubbles pushed downward by the upper turbine 4 are further pulled downward by the lower turbine 5 and are distributed angularly at 45° out of the draft tube 10. Fresh gas introduced into the draft tube 10 above the lower turbine 5 is sucked into the draft tube 10 and broken into small bubbles which are then distributed into and circulate in the tank body 1.

A gas input pipe 9 extends from an outside of the tank body 1 into the draft tube 10 with its gas outlet 91 located between the upper and the lower turbines 4, 5, so as to increase the utilization ratio of the introduced reactive gas.

A support 7 is fixedly mounted on a center of the flat bottom 2 of the tank body 1 to firmly receive a lower end of the shaft 6 therein, allowing the shaft 6 to perpendicularly located at the center of the tank body 1.

The draft tube 10 is an elongated hollow cylindrical tube having two ends with rounded edges. The draft tube 10 is fixedly suspended in the tank body 1 by means of brackets 12 formed from solid round bars and extending from an inner wall of the tank body 1 toward the center of the draft tube 10, so that the draft tube 10 is concentric with the tank body 1. The draft tube 10 has an inner diameter of about 0.4 to about 0.6 times of the inner diameter $D_t$ of the tank body 1, and a length of about 1.5 to about 4 times of the diameter d of the upper and the lower turbine 4,5.

Multiple pieces of baffles 11 are installed on an inner wall of the draft tube 10 while no baffle is installed on the inner wall of the tank body 1. Baffles 11 axially and parallelly extend on the inner wall of the draft tube 10 and have a length of about one half to about one times of the length of the draft tube 10 and a width of about one fifteenth to about one thirtieth of the inner diameter of the draft tube 10. One full set of baffles 11 may include 4 to 6 baffles which are equally spaced and symmetrically arranged to facilitate the forming of an irregular gas vortex in the draft tube 10, so that the gas vortex can be easily broken into bubbles by the blades of the turbines 4, 5 and be distributed into the tank body 1. A main function of the draft tube 10 is to control the flow of gas and liquid, to enhance the flow in axial direction, and to raise the level of the treated liquid.

Figure 4:
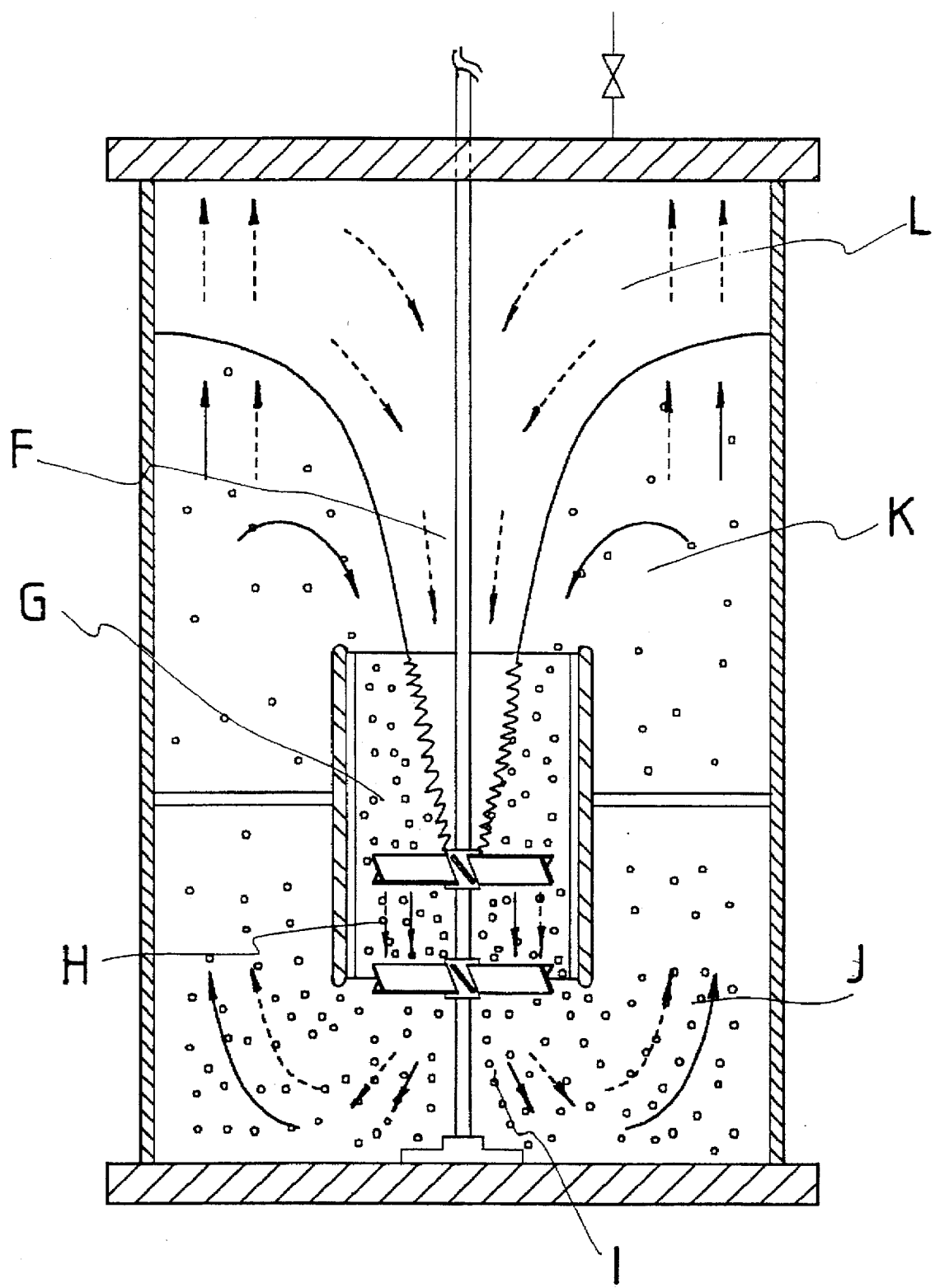
FIG. 4 illustrates the flow paths of gas and liquid in the gas-induced reactor when the reactive gas is introduced into the reactor from a top thereof and the turbines rotate at high speed.

FIG. 4 illustrates flow paths of gas and liquid in the tank body 1 when the reactive gas is input from the top of the tank body 1 and the upper and the lower turbines 4, 5 rotate at high speed. Wherein, the broken lines represent the flow paths of gas, the solid lines represent the flow paths of liquid, and the small circles represent bubbles.

When the reactive gas is introduced from the top of the tank body 1 into an upper area L in the tank body 1 and the turbines 4, 5 rotate at high speed above 1100 rpm, a regular gas vortex is formed in the tank body 1 at the surface of liquid, that is, area F. The regular gas vortex is pulled inward to the draft tube 10, that is, area G, by the rotating turbines 4, 5, and is then disturbed by the inner baffles 11 of the draft tube 10 to become an irregular gas vortex. The irregular gas vortex is then easily broken into bubbles by the upper turbine 4 and the bubbles are pushed downward toward the lower turbine 5 or an area H between the two turbines. Gas flowing into the area H in the draft tube 10 is disturbed by the inner baffles 11 to change its flow path and is driven downward by the lower turbine 5 to flow angularly at 45° out of the draft tube 10 and into an area I in the tank body 1. Then, the bubbles flow up spirally through an annular area J between the draft tube 10 and the inner wall of the tank body 1. When the bubbles move upward into an area K above the draft tube 10, a large amount of bubbles are pulled toward the shaft 6 by a liquid vortex formed by the rotating turbines 4, 5. The bubbles are then drawn into the draft tube 10 again and are broken and distributed to circulate in the tank body 1. A small portion of the bubbles in the area K, which are distant from the vortex, keep moving spirally upward and finally escape from the liquid surface and into the area L. Some quantity of the gas escaped from the liquid phase and flowing into the area L shall again be sucked back into the liquid phase by the central gas vortex for further utilization. By this way, the reactive gas introduced into the tank body 1 can be circulated many times to contact with the liquid and therefore increases the gas utilization ratio.

Figure 5:
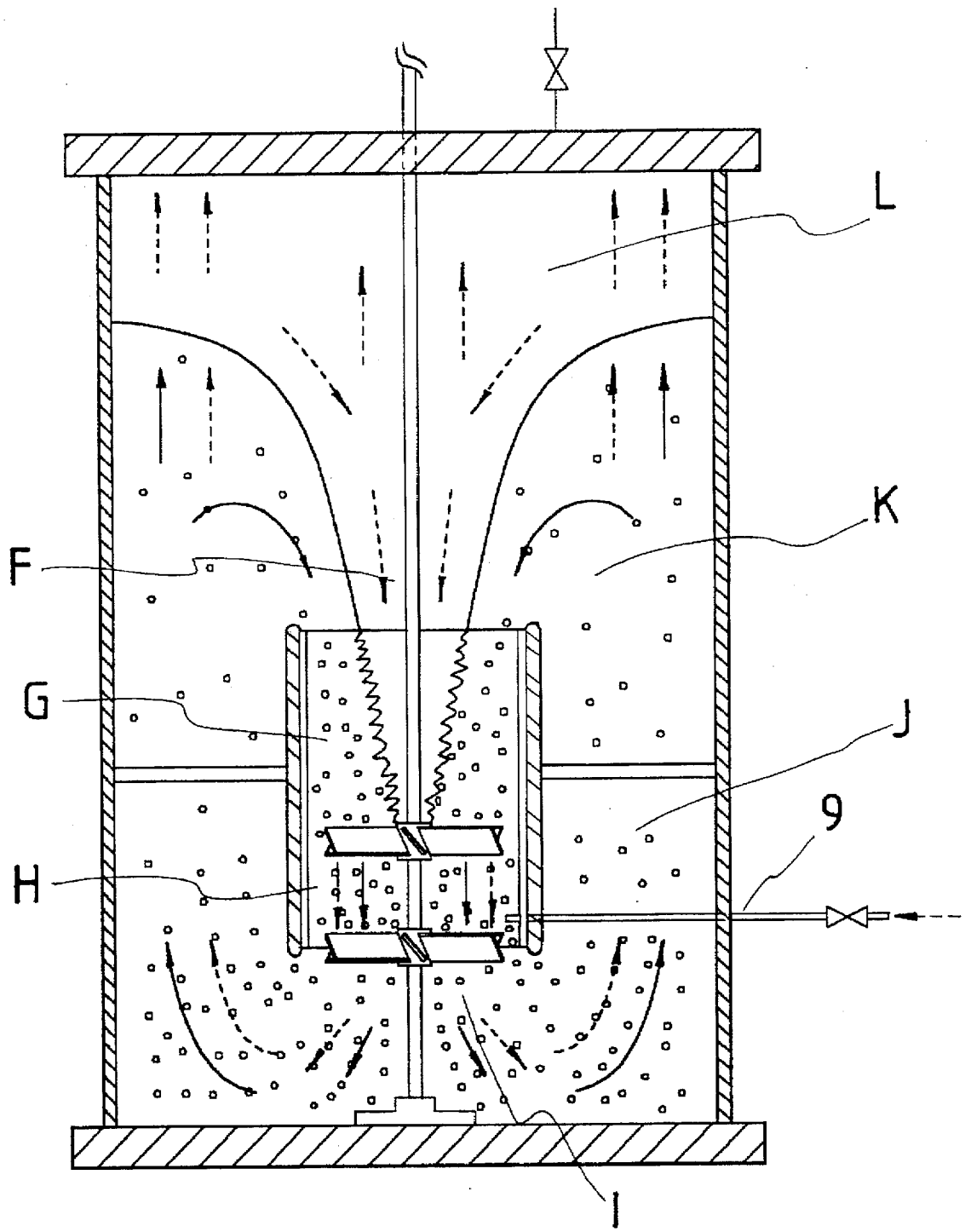
FIG. 5 illustrates the flow paths of gas and liquid in the gas-induced reactor when the reactive gas is directly introduced into the draft tube and the turbines rotate at high speed.

FIG. 5 illustrates flow paths of gas and liquid in the tank body 1 when the reactive gas is directly introduced into the draft tube 10 and the turbines 4, 5 rotate at high speed. Wherein, the broken lines represent the flow paths of gas, the solid lines represent the flow paths of liquid, and the small circles represent bubbles.

When the reactive gas is directly introduced into the draft tube 10 via the gas pipe 9 with the gas outlet 91 located between the upper and the lower turbines 4, 5, the gas vortex formed in the draft tube 10 is broken into bubbles by the lower turbine 5 to distribute into the area I. The bubbles in the area I flow spirally upward into the area I and then the area K. Bubbles flowing into the area K shall be induced into the area G by a strong pull force from the liquid vortex and the rotating turbines 4, 5 and be further broken and distributed for further utilization. A part of the bubbles in the area K that are not induced into the draft tube 10 shall keep moving upward and finally escape from the liquid surface and flow into the gas phase area L near the top of the tank body 1. A part of the gas flowing into the area L can still be sucked into the gas vortex to be circulated in the liquid phase for further utilization. By this way, the reactive gas can be repeatedly utilized and the utilization ratio of the reactive gas can therefore be largely increased.

In the reacting tank body 1 of the present invention, since flows in the areas G and H are disturbed by the inner baffles 11 of the draft tube 10 and are broken by the turbines 4, 5 rotating at high speed, good gas-liquid contact effect can be achieved. Moreover, bubbles leaving the area H in the draft tube 10 into the area I have an even diameter of about 3mm. This diameter of bubble is most suitable for a mass transfer from a gas phase into a liquid phase. Since most bubbles in the area K are induced back into the draft tube 10, the mass transfer is occurred mainly in the areas G, H, I and J in the reactor of the present invention. Compared with the conventional agitating type reactors, the gas-induced reactor of the present invention having the draft tube 10 disposed inside the tank body 1 and the tank body 1 without any baffle installed on the inner wall thereof shall largely reduce the power consumption for agitating the gas and liquid while the gas-induction is more stable and the reactive gas can be more efficiently circulated and utilized. Moreover, the employment of the draft tube 10 in the tank body 1 of the present invention can raise the operating liquid level up to twice as that of the conventional agitating type reactor and facilitates an increased amount of treated liquid and gas. All of these features are not found in the existed gas-liquid reactors.

Although the present invention includes some elements that are currently known and existed, the whole present invention creates a gas-liquid flowing phenomenon, behavior and effect that are completely different from that created by the conventional gas-liquid reactors. In brief, the gas-induced reactor provided by the present invention is a reactor which enables very well gas-liquid and gas-liquid-solid (the solid phase is powdered catalyst) reaction.

What is claimed is:

1. A gas-induced reactor which creates a gas-induction phenomenon and enables bubbles to circulate in liquid phase through agitating at high rotating speed, comprising:

an elongated cylindrical tank body without any baffle installed on an inner wall thereof, a flat bottom and a top cover respectively closing a bottom and a top of said tank body;

a shaft perpendicularly extending through a longitudinal central axis of said tank body with a lower end thereof inserted into a support fixedly mounted to a center of said flat bottom, so that said shaft is coaxial with said tank body; said shaft being driven to rotate by an external motor;

draft tube which is a hollow cylindrical tube being fixedly suspended in said tank body by brackets extending from said inner wall of said tank body toward a center of said draft tube so that said draft tube is concentric with said tank body; said draft tube being provided on an inner wall with a plurality of axially and parallelly extended, symmetrically arranged and equally spaced baffles;

an upper and a lower turbines serially and fixedly mounted on said shaft and enclosed by said draft tube, each of said turbines having six 45° pitched, rectangular, flat blades, said turbines each having an overall diameter of 0.3 to 0.5 times of a diameter of said tank body, said blades each having a width of one eighth of said diameter of said turbines, and said lower turbine being located in a lower portion of said draft tube on a level with a lower end of said draft tube; and a gas input pipe extending from an outside of said tank body into said tank body;

whereby when said upper and said lower turbines rotate at high speed along with said shaft driven by said external motor, a downward central regular gas vortex is formed at a center of a liquid surface in said tank body above said draft tube; said regular gas vortex being pulled inward to said draft tube by said two rotating turbines and being disturbed by said inner baffles to form an irregular gas vortex inside said draft tube; said regular and said irregular gas vortices creating a gas-induction phenomenon in said tank body to increase the length of flow paths of gas and liquid and the numbers of circulation of introduced reactive gas in said tank body.

2. A gas-induced reactor as claimed in claim 1, wherein said draft tube in said tank body has a length of 1.5 to 4 times of said diameter of said turbines and an inner diameter of 0.4 to 0.6 times of said inner diameter of said tank body, and said draft tube having two ends with rounded edges.

3. A gas-induced reactor as claimed in claim 2, wherein said perpendicularly extended baffles provided on said inner wall of said draft tube have a width of one fifteenth to one thirtieth of said inner diameter of said draft tube and a length of one half to one times of said length of said draft tube.

4. A gas-induced reactor as claimed in claim 1, wherein said gas input pipe extends into said draft tube with a gas outlet located between said upper and said lower turbines.

5. A gas-induced reactor as claimed in claim 1, wherein said baffles in said draft tube include 4 to 6 baffles.

* * * * *